(12) United States Patent
Zhu et al.

(10) Patent No.: US 10,433,403 B2
(45) Date of Patent: Oct. 1, 2019

(54) METHOD FOR REPORTING BRIGHTNESS-ADJUSTING DATA, LIGHTING DEVICE, AND GATEWAY

(71) Applicant: ZHEJIANG SHENGHUI LIGHTING CO., LTD, Jiaxing (CN)

(72) Inventors: Ge Zhu, Jiaxing (CN); Xiaoping Zhu, Jiaxing (CN); Jinxiang Shen, Jiaxing (CN)

(73) Assignee: ZHEJIANG SHENGHUI LIGHTING CO., LTD., Jiaxing (CN)

( * ) Notice: Subject to any disclaimer, the term of this patent is extended or adjusted under 35 U.S.C. 154(b) by 0 days.

(21) Appl. No.: 15/743,934

(22) PCT Filed: Feb. 13, 2017

(86) PCT No.: PCT/CN2017/073372
§ 371 (c)(1),
(2) Date: Jan. 11, 2018

(87) PCT Pub. No.: WO2017/143916
PCT Pub. Date: Aug. 31, 2017

(65) Prior Publication Data
US 2018/0206313 A1    Jul. 19, 2018

(30) Foreign Application Priority Data
Feb. 24, 2016    (CN) .......................... 2016 1 0102684

(51) Int. Cl.
*H05B 37/02*    (2006.01)
(52) U.S. Cl.
CPC ..... *H05B 37/0272* (2013.01); *H05B 37/0218* (2013.01); *H05B 37/0245* (2013.01); *H05B 37/0281* (2013.01); *Y02B 20/48* (2013.01)

(58) Field of Classification Search
CPC .... H05B 33/08; H05B 33/0845; H05B 37/02; H05B 37/0218; H05B 37/0245;
(Continued)

(56) References Cited

U.S. PATENT DOCUMENTS

2011/0102854 A1*    5/2011   Cho ...................... G06T 11/60
                                                        358/403
2014/0239816 A1*    8/2014   Lee .................... H05B 33/0842
                                                        315/130
(Continued)

FOREIGN PATENT DOCUMENTS

CN    101583221 A    11/2009
CN    201947492 U    8/2011
CN    105682324 A    6/2016

OTHER PUBLICATIONS

The World Intellectual Property Organization (WIPO) International Search Report for PCT/CN2017/073372 dated May 9, 2017 12 Pages.

*Primary Examiner* — Thai Pham
(74) *Attorney, Agent, or Firm* — Anova Law Group, PLLC (57) ABSTRACT

The present disclosure provides a method for reporting brightness-adjusting data from a smart lighting device, a smart lighting device, and a gateway. The method includes: receiving a brightness-adjusting command from a smart terminal, the brightness-adjusting command containing brightness-adjusting data having a desired brightness value; adjusting a brightness value to the desired brightness value according to the brightness-adjusting command; and reporting the brightness-adjusting data and a serial number corresponding to the brightness-adjusting data to a gateway.

11 Claims, 3 Drawing Sheets

(58) Field of Classification Search
CPC ................... H05B 37/0281; H05B 37/0272; Y02B 20/48; Y02B 20/70
See application file for complete search history.

(56) References Cited

U.S. PATENT DOCUMENTS

2015/0038165 A1* 2/2015 Tuo ................. G01C 21/206
 455/456.1
2017/0347433 A1* 11/2017 Sierla ............... H05B 37/0245

* cited by examiner

FIG. 4

METHOD FOR REPORTING BRIGHTNESS-ADJUSTING DATA, LIGHTING DEVICE, AND GATEWAY

CROSS-REFERENCES TO RELATED APPLICATIONS

This application claims the priority of Chinese Patent Application No. 201610102684.5 filed on Feb. 24, 2016, the entire content of which is incorporated herein by reference.

FIELD OF THE DISCLOSURE

The present disclosure relates to the field of light emitting diode (LED) technologies and, more particularly, relates to a method for reporting brightness-adjusting data, a smart lighting device, and a gateway.

BACKGROUND

A smart lighting device is a lighting device which can facilitate smart control by a smart terminal. Lighting standards are specified standards based on brightness values required by visual work in various environments. Often, the brightness requirements of a same lighting device may be different for a user at different times. For example, a higher brightness value is often required when a user is working, and a reduced brightness value is desired at other times to conserve energy. Thus, the brightness value of a smart lighting device needs to be adjusted based on the user's needs. Also, it is desired that diming/light-adjusting data of a smart lighting device can be reported to a server such that the user can obtain the brightness-adjusting result.

Currently, the brightness of a smart lighting device is mainly implemented through an application (APP) installed on a smart terminal. For example, when the brightness value needs to be adjusted, a brightness-adjusting command can be sent to a smart lighting device through the APP installed on the smart terminal. After the smart lighting device adjusts the brightness value based on the brightness-adjusting command, the brightness-adjusting data can be reported to a server through a gateway. The user can obtain and observe the brightness-adjusting data through the APP installed on the smart lighting terminal. Thus, the user can acknowledge the brightness-adjusting result.

However, when the smart lighting device reports the brightness-adjusting data to the server through a gateway and a wireless network, due to various reasons, such as transmission delay or multiple transmission retry, some brightness-adjusting data sent by the smart lighting device at an earlier time may arrive at the gateway later than some brightness-adjusting data sent by the smart lighting device at a later time. This can cause the brightness-adjusting result, obtained by the user from the server, to be different from the actual outcome. As a result, the accuracy of the brightness-adjusting result can be impaired, and user experience is adversely affected.

BRIEF SUMMARY OF THE DISCLOSURE

One aspect of the present disclosure provides a method for reporting brightness-adjusting data from a smart lighting device, including: receiving a brightness-adjusting command from a smart terminal, the brightness-adjusting command containing brightness-adjusting data having a desired brightness value; adjusting a brightness value to the desired brightness value according to the brightness-adjusting command; and reporting the brightness-adjusting data and a serial number corresponding to the brightness-adjusting data to a gateway.

Optionally, the serial number increases in accordance with a sequence the brightness-adjusting data is reported to the gateway.

Optionally, the method further includes: determining, by the gateway, whether the serial number is greater than a latest serial number stored in the gateway. When the serial number is greater than the latest serial number, reporting, by the gateway, the brightness-adjusting data to a server such that the server updates a brightness-adjusting result using the brightness-adjusting data and the gateway updates the latest serial number with the serial number, and when the serial number is smaller than the latest serial number, discarding, by the gateway, the brightness-adjusting data, to maintain the brightness-adjusting data in the server.

Optionally, the brightness-adjusting data includes a plurality of brightness-adjusting data each containing a serial number different from one another, the serial number in accordance with a time sequence a corresponding brightness-adjusting data is reported to the gateway and a later-reported serial number being greater than an earlier-reported serial number.

Optionally, the latest serial number stored in the gateway is an initial serial number equal to zero, the initial serial number being a serial number before the gateway receives brightness-adjusting data.

Optionally, the brightness-adjusting data includes a first light-adjusting data corresponding to a first serial number, and a second brightness-adjusting data corresponding to a second serial number; and the first light-adjusting data with the first serial number is reported to the gateway before the second light-adjusting data with the second serial number, the second serial number being greater than the first serial number and the first serial number being greater than the initial serial number.

Optionally, the smart lighting device receives the brightness-adjusting command through wireless transmission means from the smart terminal; and the smart lighting device reports the brightness-adjusting data and the serial number to the gateway through wireless transmission means.

Optionally, the wireless transmission means includes one or more of a Zigbee transmission, WiFi transmission, and Bluetooth transmission.

Another aspect of the present disclosure provides a smart lighting device, including a light source, a power supply component, a communication module, and a control module. The power supply component provides power for the light source, the communication module, and the control module. The communication module receives a brightness-adjusting command from a smart terminal, the brightness-adjusting command containing brightness-adjusting data having a desired brightness value. The control module adjusts a brightness value of the smart lighting device to the desired brightness value. The communication module reports the brightness-adjusting data and a serial number corresponding to the brightness-adjusting data to a gateway after the control module completes adjusting the brightness value of the smart lighting device.

Optionally, the serial number increases in accordance with a sequence the brightness-adjusting data is reported to the gateway.

Optionally, the brightness-adjusting data includes a plurality of brightness-adjusting data each containing a serial number different from one another, the serial number in accordance with a time sequence a corresponding brightness-adjusting data is reported to the gateway.

Optionally, the communication module reports each brightness-adjusting data with a corresponding serial number to the gateway in accordance with the time sequence, a later-reported serial number being greater than an earlier-reported serial number.

Another aspect of the present disclosure provides a gateway, including: a communication module, a processor, and a storage. The communication receives brightness-adjusting data and a serial number contained in the brightness-adjusting data sent by a smart lighting device. The processor determines whether the serial number is greater than a latest serial number stored in the gateway. The storage stores executable commands used by the communication module and the processor.

Optionally, the processor determines whether the serial number is greater than the latest serial number stored in the gateway. When the serial number is greater than the latest serial number, updates the latest serial number with the serial number, and when the serial number is smaller than the latest serial number, discards the brightness-adjusting data, to maintain the brightness-adjusting data in the server.

Optionally, the processor further reports the brightness-adjusting data to a server when the serial number is greater than the latest serial number such that the server updates a brightness-adjusting result using the brightness-adjusting data.

Optionally, the latest serial number is an initial serial number equal to zero, the initial serial number being a serial number before the gateway receives brightness-adjusting data.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

After adjusting brightness value, a smart lighting device often reports the brightness-adjusting data to the server through a gateway and a wireless network, so that a user can obtain the brightness-adjusting data, stored on the server, through the smart terminal. The brightness-adjusting data can be displayed on the APP installed on the smart terminal, and the user can acknowledge the light-adjusting result. However, when the smart light device reports the brightness-adjusting data to the server through the gateway and wireless network, due to various reasons, such as transmission delay or multiple transmission retry, some brightness-adjusting data sent by the smart lighting device at an earlier time may arrive at the gateway later than some brightness-adjusting data sent by the smart lighting device at a later time. This can cause the brightness-adjusting result, obtained by the user from the server, to be different from the actual outcome. As a result, the accuracy of the brightness-adjusting result can be impaired, and user experience is adversely affected.

For example, a user wants to adjust the brightness value of the smart lighting device from 10 to 80. After receiving the brightness-adjusting command, the smart lighting device can start adjusting the brightness value from 10 to 80. During this process, when the brightness value is changing, the smart lighting device may report diming data, e.g., brightness values 10, 50, 70, and 80, consecutively to the gateway. However, the reported data of the brightness value 50 may be delayed due to network reasons. As a result, when the data of brightness value 50 is reported to the gateway, the data of brightness value 80 has arrived at or been reported to the gateway. That is, the data of brightness value 80 has arrived at the gateway before the data of brightness value 50. Thus, the gateway receives the data of brightness value 50 at the last. Accordingly, the latest brightness-adjusting data reported to the server, i.e., the final brightness-adjusting result obtained by the user from the smart terminal, is brightness value 50, which is inconsistent with the actual brightness-adjusting result "brightness value 80" of the smart lighting device. That is, the displayed brightness-adjusting result is inaccurate, and the user experience is impaired.

To solve the abovementioned problems, the present disclosure provides a method for reporting brightness-adjusting data, a smart lighting device, and a gateway. The disclosed method and devices may solve the problems of, e.g., inaccurate display of brightness-adjusting results and poor user experience in conventional method for reporting diming data.

Figure 1:
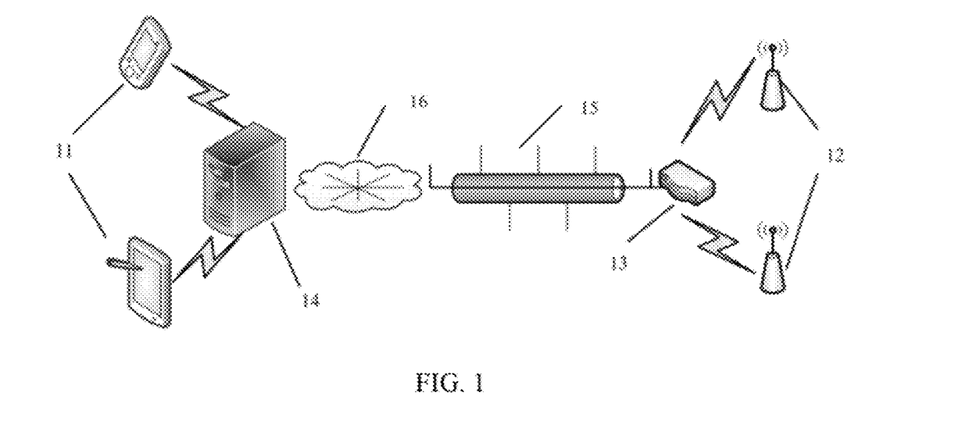
FIG. 1 illustrates an operation environment of an exemplary process for brightness-adjusting data reporting consistent with various disclosed embodiments of the present disclosure.

FIG. 1 illustrates an operation environment of the disclosed method for reporting brightness-adjusting data. As shown in FIG. 1, the operation environment may include smart lighting devices 12, smart terminals 11, a gateway 13, and a server 14. Element 15 represents the Ethernet, and element 16 represents the transmission media, e.g., cloud, for data transmission. A smart lighting device 12 may receive a brightness-adjusting command sent by the smart terminal 11, and adjust the brightness value based on the brightness-adjusting command. Further, the smart lighting device 12 may report the brightness-adjusting data to the gateway 13 through a wireless network. The gateway 13 may process the received brightness-adjusting data and report the processed brightness-adjusting data to the server 14. The user may obtain the brightness-adjusting data on the server 14 through a smart terminal 11 such as a smart phone or a tablet computer. The brightness-adjusting result may be displayed in an APP installed on a smart terminal 11.

The smart terminals 11 may include but may not be limited to mobile terminal devices such as smart phones and tablet computers. The smart terminals 11 may also include smart devices with wireless transmission functions, such as video phones, conference terminals, personal computers (PCs), and personal digital assistants (PDAs). That is, any suitable smart device with wireless communication functions may be used as the smart terminals 11 in the present disclosure. The embodiments of the present disclosure should not limit the specific forms of the smart terminals.

Figure 2:
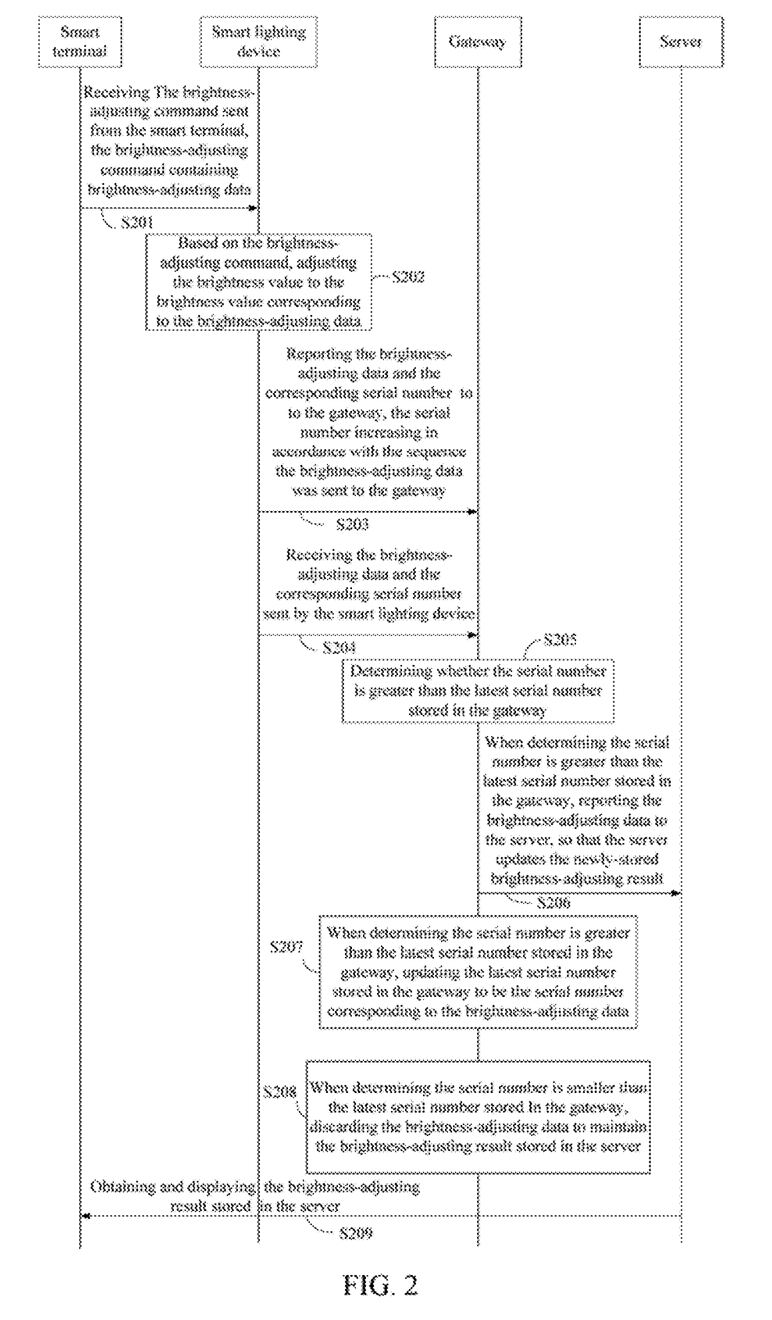
FIG. 2 illustrates data interaction in an exemplary process for brightness-adjusting data reporting consistent with various disclosed embodiments of the present disclosure.

FIG. 2 illustrates an exemplary data interaction process in the disclosed method for reporting brightness-adjusting data. The disclosed data interaction may be applied in the operation environment illustrated in FIG. 1. As shown in FIG. 2, the disclosed method for reporting data-adjustment data may include steps S201-S209.

In step S201, a smart lighting device may receive a brightness-adjusting command sent from a smart terminal, the brightness-adjusting command including light-adjusting data.

Specifically, a user may want to adjust the brightness or brightness value of a smart lighting device, and the user may send a brightness-adjusting command to the smart lighting device through the smart terminal. The smart lighting device may receive the brightness-adjusting command. The brightness-adjusting command may include brightness-adjusting data such as brightness values.

In some embodiments, the smart lighting device may receive the brightness-adjusting command sent by the smart terminal through wireless communication means. The wireless communication means may include and may not be limited to Zigbee transmission method, WiFi transmission method, and Bluetooth transmission method. Accordingly, the smart lighting device may also be, for example, a Zigbee smart lighting device, a WiFi smart lighting device, and a Bluetooth smart lighting device, respectively.

In step S202, the smart lighting device may adjust the current brightness value to the brightness value corresponding to the brightness-adjusting data, according to the brightness-adjusting command. After the smart lighting device receives the brightness-adjusting command sent by the smart terminal, the smart lighting device may adjust the brightness based on the brightness-adjusting command so that the brightness of the smart lighting device may be adjusted to the brightness value corresponding to the brightness-adjusting data.

In step S203, the smart lighting device may report the brightness-adjusting data and the serial number corresponding to the brightness-adjusting data to the gateway. The serial number may increase as the sequence of the corresponding brightness-adjusting data, reported to the gateway, increases.

After completing the brightness adjustment, the smart lighting device may report the brightness-adjusting data corresponding to the brightness value to the gateway such that the gateway may report the brightness-adjusting data to the server. Specifically, the serial number corresponding to the brightness-adjusting data may be associated with the time the smart lighting device reporting the brightness-adjusting data to the gateway. A later time the lighting device reporting the brightness-adjusting data to the gateway may correspond to a greater serial number. For example, if the brightness-adjusting data includes a first brightness-adjusting data and a second brightness-adjusting data, the first brightness-adjusting data corresponding to a first serial number, the second brightness-adjusting data corresponding to a second serial number, the smart lighting device may report brightness-adjusting data and the corresponding serial numbers to the gateway. A serial number may increase in accordance with the sequence/order the corresponding brightness-adjusting data is reported to the gateway. Specifically, the smart lighting device may sequentially report the first brightness-adjusting data with the first serial number, and the second brightness-adjusting data with second serial number to the gateway in the order of time. The second serial number may be greater than the first serial number. Thus, for example, the first serial number corresponding to the first brightness-adjusting data, being reported first, may be 1; the second serial number corresponding to the second brightness-adjusting data, being reported second, may be 2; and so on.

In the present disclosure, the serial numbers 1 and 2 are only exemplary. It is only desired that the serial number corresponding to a later-reported brightness-adjusting data is greater than the serial number corresponding to an earlier-reported brightness-adjusting data.

In one embodiment, assuming the brightness-adjusting data to be the firstly-reported brightness-adjusting data in a brightness-adjusting process, so that it can be assumed the serial number corresponding to the firstly-reported brightness-adjusting data to be 1. In some embodiments, a serial number field or serial data field may be arranged in the application programming interface (API) of communication data. Table 1 illustrates the protocol field in the API of exemplary brightness-adjusting data reported by a smart lighting device. The head of the data packet, "A5 5A" represents the identification of the data packet, indicating the starting of the packet; the serial number, "SN" represents the unique serial number of the data packet; the data length represents the length of data contained in the data packet; the data represents the data information carried by the data packet, and the length of the data is the length represented by "data length"; and the checksum, "CRC" represents the verification information carried by the data packet, used for verifying whether the data packet is a desired/correct data packet. The serial number "SN" represents the unique serial number of the data packet or the brightness-adjusting data during data transmission. The serial number "SN" increases in accordance with the time sequence.

TABLE 1

The protocol field in the API of the brightness-adjusting data reported by a smart lighting device

| Head | Serial number (SN) | Data length | data | Checksum (CRC) |
|---|---|---|---|---|
| A5 5A | Greater than 1 | Greater than 0 | | The checksum from SN field to data |

In various embodiments, the serial number field may be any suitable format indicative of the time sequence of the serial number/brightness-adjusting data. For example, a serial number may be a time stamp, a suitable marking, or a combination of different data fields. The gateway may be configured to recognize the data formats and/or do proper conversion/combination to obtain the serial number of brightness-adjusting data. Also, the serial number may be generated by the smart terminal or the smart lighting device. For example, the APP on the smart terminal may be configured to generate a serial number corresponding to brightness-adjusting data, and send the serial number together with the brightness-adjusting data to the smart lighting device. In certain embodiments, the brightness-adjusting data sent by the smart terminal may not contain a serial number. The smart lighting device may be configured to determine the serial number corresponding to the received brightness-adjusting data based on certain information contained in the brightness-adjusting data.

In some embodiments, the APP on the smart terminal may have different options for brightness adjustments or dimming. For example, the APP may provide options such as "slow dimming" and "fast dimming". The smart terminal may accordingly send serial numbers and brightness-adjusting data at different rates. For example, the time interval between two adjacent brightness-adjusting data sent to the smart lighting device for slow dimming may be longer than the time interval for fast dimming. This configuration may reduce the possibility a later-reported brightness-adjusting data being reported to the gateway before an earlier-reported brightness-adjusting data. Specific configuration may be according to different applications and should not be limited by the embodiments herein.

In step S204, the gateway may receive the brightness-adjusting data and the serial number corresponding to the brightness-adjusting data sent by the smart lighting device. Specifically, the gateway may receive the brightness-adjusting data and the serial number corresponding to the brightness-adjusting data through wireless transmission means. For example, the communication module of the gateway may be integrated with wireless communication functions of Zigbee, WiFi, and/or Bluetooth.

In step S205, the gateway may determine whether the received serial number is greater than the latest serial number stored in the gateway. If the received serial number is greater than the latest serial number stored in the gateway, the process may proceed to steps S206 and S207. If the received serial number is not greater than the latest serial number stored in the gateway, the step may proceed to step S208.

Specifically, if the gateway receives the brightness-adjusting data reported by the smart lighting device, the gateway may obtain the serial number corresponding to the brightness-adjusting data. The serial number may be contained in the corresponding brightness-adjusting data. The gateway may compare the received serial number with the latest serial number, stored in the gateway.

In the present disclosure, the serial number contained in the brightness-adjusting data may correspond to the brightness-adjusting data and may be referred to as "the corresponding serial number", the "serial number corresponding to the brightness-adjusting data", or the like. A serial number may be in accordance with the sequence/time sequence the corresponding brightness-adjusting data, containing the serial number, is reported to the gateway. For example, a serial number may be an integer greater than zero to indicate the sequence/order the brightness-adjusting data is reported to the gateway. In various embodiments of the present disclosure, the terms "first", "second", and the like are used to distinguish different brightness-adjusting data and serial numbers, and may or may not indicate a specific sequence/order of the brightness-adjusting data or the serial number. For example, a first brightness-adjusting data may be the first brightness-adjusting data reported to the gateway in an embodiment, or may merely be a brightness-adjusting data different from a second brightness-adjusting data in another embodiment. The specific meanings of "first", "second", and the like may be referred to the specific embodiment/context.

In one embodiment, the initial serial number stored in the gateway may be 0. The initial serial number may be the serial number stored in the gateway before the gateway receives any brightness-adjusting data. It can be assumed that the brightness-adjusting data is a firstly-reported brightness-adjusting data in the brightness-adjusting process, i.e., the gateway did not receive other serial numbers before the current brightness-adjusting data. Given the abovementioned conditions, if the numbering of serial numbers is in accordance with the process described in step S203, the serial number corresponding to the brightness-adjusting data may be 1, and the latest serial number stored in the gateway may be 0. Thus, in one embodiment, the gateway may compare the serial number 1, corresponding to the currently-received brightness-adjusting data, with the latest serial number 0, stored in the gateway.

In step S206, when the gateway determines the received serial number corresponding to the received brightness-adjusting data is greater than the latest serial number stored in the gateway, the gateway may report the received brightness-adjusting data to the server, such that the server may update the brightness-adjusting result stored in the server.

In step S207, when the gateway determines the received serial number corresponding to the received brightness-adjusting data is greater than the latest serial number stored in the gateway, the gateway may update the latest serial number stored in the gateway to be the received serial number.

Specifically, if the gateway determines the received serial number, corresponding to the received brightness-adjusting data, is greater than the latest serial number stored in the gateway, the gateway may report the received brightness-adjusting data to the server, and update the serial number stored in the gateway.

For example, if the brightness-adjusting data is a firstly-reported brightness-adjusting data, the serial number corresponding to the firstly-reported brightness-adjusting data may be 1. The latest serial number stored in the gateway may be 0. Thus, the gateway may determine the received serial number 1 to be greater than the latest serial number 0 stored in the gateway. At this time, the gateway may report the brightness-adjusting data to the server, and update the latest serial number stored in the gateway to be 1. Correspondingly, in another embodiment, the brightness-adjusting data may contain a firstly-reported brightness-adjusting data and a secondly-reported brightness-adjusting data, which correspond to a first serial number and a second serial number, respectively. If the smart lighting device reports the secondly-reported brightness-adjusting data after reporting the firstly-reported brightness-adjusting data, i.e., the secondly-reported brightness-adjusting data being reported later than the firstly-reported brightness-adjusting data, the second serial number may be greater than the first serial number. Assuming the first serial number is 1, the second serial number may be 2. Accordingly, after receiving the secondly-reported brightness-adjusting data, the gateway may compare the second serial number 2 with the latest serial number 1 stored in the gateway. Because 2 is greater than 1, the gateway may report the secondly-reported brightness-adjusting data to the server, and update the latest serial number stored in the gateway to be 2.

In step S208, when the gateway determines the received serial number is smaller than the latest serial number stored in the gateway, the gateway may discard the received brightness-adjusting data corresponding to the received serial number, to maintain the brightness-adjusting result stored in the server. If the gateway determines the received serial number is smaller than the latest serial number stored in the gateway, the received brightness-adjusting data may have undergone delay during the transmission, and may be received later than the brightness-adjusting data reported at a later time. Thus, to ensure the accuracy of the brightness-adjusting data reported by the gateway, the gateway may discard the received brightness-adjusting data to maintain the brightness-adjusting result stored in the server.

For example, if the brightness-adjusting data is the firstly-reported brightness-adjusting data, the serial number corresponding to the firstly-reported brightness-adjusting data may be 1. However, the gateway may have received the secondly-reported brightness-adjusting data prior to receiving the firstly-reported brightness-adjusting data. That is, the latest serial number stored in the gateway may be 2. Thus, when determining the received serial number 1 is smaller than the latest serial number 2 stored in the gateway, the gateway may discard the firstly-reported brightness-adjusting data to maintain the brightness-adjusting result stored in the server.

In step S209, the smart terminal may obtain and display the brightness-adjusting result stored in the server.

Specifically, as described from steps S205-S208, the gateway may compare the received serial number with the latest serial number stored in the gateway, and may process the received brightness-adjusting data corresponding to the received serial number based on two conditions, i.e., the received serial number being greater or smaller than the latest serial number stored in the gateway. It can be ensured that the brightness-adjusting data the gateway reports to the server is the final brightness-adjusting data, i.e., the brightness-adjusting data corresponding to the latest adjustment by the user. Thus, a smart terminal may obtain accurate brightness-adjusting result from the server.

The present disclosure provides a method for reporting brightness-adjusting data. The brightness-adjusting commands, received by the smart lighting device, are used to adjust the brightness of the smart lighting device. The gateway may compare the receive serial number, contained in the brightness-adjusting data received by the gateway from the smart lighting device, with the latest serial number stored in the gateway. When the received serial number is greater than the latest serial number stored in the gateway, the gateway may report the received brightness-adjusting data to the server and update the latest serial number stored in the gateway. When the received serial number is smaller than the latest serial number stored in the gateway, the received brightness-adjusting data may be discarded, to ensure the brightness-adjusting data stored in the server to be the accurate brightness-adjusting result. The problem of inaccurate display of brightness-adjusting result caused by network issues can be solved.

In some embodiments, in the disclosed method for reporting brightness-adjusting data, the initial serial number stored in the gateway may be zero, which represents the serial number stored in the gateway before receiving any brightness-adjusting data. Specifically, the initial serial number stored in the gateway may be set to be zero. In various embodiments, the initial serial number stored in the gateway may also be other suitable values. It is desired that the value of the serial number, contained in the brightness-adjusting data and reported by the smart lighting device, and the value of the initial serial number are represented by a reasonable relation. The specific values of the serial numbers should not be limited by the embodiments of the present disclosure.

Further, in the disclosed method for reporting the brightness-adjusting data, the value of the serial number may increase in accordance with the sequence the corresponding brightness-adjusting data is reported to the gateway. The reasons are provided as follows.

To distinguish the serial numbers corresponding to different brightness-adjusting data, in one embodiment, the serial numbers corresponding to the brightness-adjusting data may be numbered in accordance with the time sequence the smart lighting device reports the corresponding brightness-adjusting data to the gateway. For example, if assuming the serial number corresponding to the firstly-reported brightness-adjusting data is 1, the serial number corresponding to the secondly-reported brightness-adjusting data can be defined to be 2. In various embodiments, when the serial number corresponding to the firstly-reported brightness-adjusting data is 1, the serial number corresponding to the secondly-reported brightness-adjusting data can also be 3 or other suitable values greater than 3. It is desired that the serial number corresponding to the secondly-reported brightness-adjusting data being greater than the serial number corresponding to the secondly-reported brightness-adjusting data. The specific values of the serial numbers should not be limited by the embodiments of the present disclosure.

Further, in the disclosed method for reporting brightness-adjusting data, if the brightness-adjusting data includes a first brightness-adjusting data, a second brightness-adjusting data, and a third brightness-adjusting data, respectively corresponding to a first serial number, a second serial number, and a third serial number. The smart lighting device may sequentially adjust the brightness values, according to a brightness-adjusting command, to the brightness values contained respectively in the first brightness-adjusting data, the second-brightness-adjusting data, and the third brightness-adjusting data. Further, the smart lighting device may report, according to the time sequence, the first serial number with the corresponding first light-adjusting data, the second serial number with the corresponding second light-adjusting data, and the third serial number with the corresponding third light-adjusting data to the gateway. Because the second light-adjusting data is reported secondly, later than the first light-adjusting data (reported firstly) and before the third brightness-adjusting data (reported thirdly), the second serial number should be greater than the first serial number and smaller than the third serial number.

In some embodiments, in the disclosed method, if the time the gateway receives the first brightness-adjusting data is later than the time the gateway receives the second brightness-adjusting data and prior to the time the gateway receives the third brightness-adjusting data, the latest serial number stored in the gateway, when receiving the first brightness-adjusting data, may be the second serial number. Thus, if the gateway determines the first serial number is smaller than the latest serial number stored in the gateway, the gateway may discard the first brightness-adjusting data.

Correspondingly, when receiving the third brightness-adjusting data, the latest serial number stored in the gateway may be the second brightness-adjusting data. At this time, the gateway may determine the third serial number to be greater than the latest serial number stored in the gateway. The gateway reports the third brightness-adjusting data to the server, and update the latest serial number, stored in the gateway, to be the third serial number.

Specifically, assuming the first brightness-adjusting data, the second brightness-adjusting data, and the third brightness-adjusting data correspond to brightness values of 10, 50, and 80, respectively. The first brightness-adjusting data, the second brightness-adjusting data, and the third brightness-adjusting data may correspond to the first serial number, the second serial number, and the third serial number of 1, 2, and 3, respectively. The smart lighting device may report, according to the time sequence, the first brightness-adjusting data 10 with the first serial number 1, the second brightness adjusting data 50 with the second serial number 2, and the third brightness-adjusting data 80 with the third serial number 3, to the gateway.

If the time gateway receives the first brightness-adjusting data 10 with the first serial number 1 is later than the time the gateway receives the second brightness-adjusting data 50 with the second serial number 2 and prior to the time the gateway receives the third brightness-adjusting data 80 with the third serial number 3, when the gateway receives the first brightness-adjusting data 10 with the first serial number 1, the gateway may have already received the second brightness-adjusting data 50 with the second serial number 2 but have not received the third brightness-adjusting data 80 with the third serial number 3.

Thus, when the gateway receives the first brightness-adjusting data 10 with the first serial number 1, the latest serial number stored in the gateway may be the second serial number 2, and the gateway may compare the first serial number 1 with the latest serial number 2 stored in the gateway. Because 1 is smaller than 2, the gateway may discard the first brightness-adjusting data 10 and maintain the brightness-adjusting result stored in the server.

Further, when the gateway receives the third brightness-adjusting data 80 with the third serial number 3, the latest serial number stored in the gateway may be the second serial number 2, and the gateway may compare the third serial number 3 with the latest serial number 2 stored in the gateway. Because 3 is greater than 2, the gateway may report the third brightness-adjusting data 80 to the server, and update the latest serial number, stored in the gateway, to be the third serial number 3.

Figure 3:
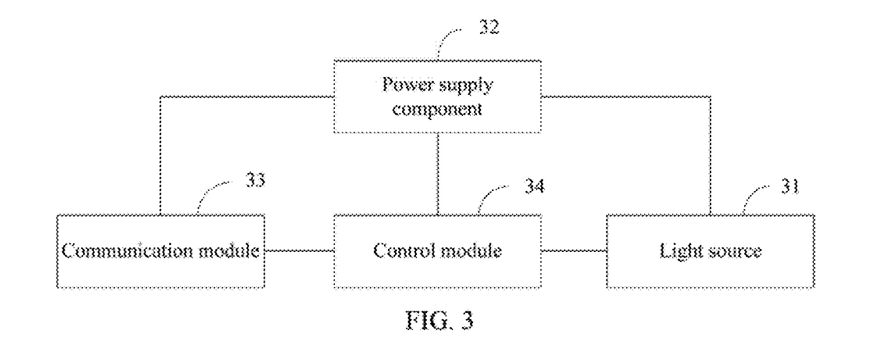
FIG. 3 illustrates a block diagram of an exemplary smart lighting device consistent with various disclosed embodiments of the present disclosure.

FIG. 3 illustrates an exemplary block diagram of a smart lighting device. As shown in FIG. 3, the disclosed smart lighting device may include a light source 31, a power supply component 32, a communication module 33, and a control module 34.

The power supply component 32 may provide power or electricity for each element, e.g., the light source 31, the communication module 33, and the control module 34. The communication module 33 may receive the brightness-adjusting command sent by the smart lighting device. The brightness-adjusting command may include brightness-adjusting data. The control module 34 may adjust the brightness value of the light source 31 to the brightness value contained in the brightness-adjusting data according to a brightness-adjusting command. Correspondingly, the communication module 33 may, after the control module 34 completes the brightness adjustment of the light source 31, report the brightness-adjusting data and the serial number corresponding to the brightness-adjusting data to the gateway. The serial number may increase accordingly with the order/sequence the brightness-adjusting data is reported to the gateway.

The disclosed smart lighting device may be smart lighting device used in the method shown in FIG. 2. The smart lighting device may implement the technical solution provided in the method shown in FIG. 2. The specific functions of the disclosed smart lighting device should be referred to the description of the method and are not repeated herein.

The disclosed smart lighting device may receive the brightness-adjusting command, sent by a smart terminal, through the communication module. The brightness-adjusting command may include the brightness-adjusting data. The smart lighting device may adjust, through the control module, the brightness value of the light source according to the brightness-adjusting command. After the control module completes the adjustment of the brightness value of the light source, the disclosed smart lighting device may report the brightness-adjusting data and the serial number corresponding to the brightness-adjusting data to the gateway through the communication module. In the disclosed technical solution, by reporting the serial number at the same time with the brightness-adjusting data, the gateway may process the brightness-adjusting data properly based on the received serial number. Thus, inaccurate display of brightness-adjusting results due to network issues can be solved.

Further, in the disclosed gateway, if the brightness-adjusting data includes a first brightness-adjusting data and a second brightness-adjusting data, the first brightness-adjusting data corresponding to a first serial number and the second brightness-adjusting data corresponding to a second serial number, the communication module 33 may report the first brightness-adjusting data with the first serial number, and the second brightness-adjusting data with the second serial number, to the gateway according to the time sequence. Thus, the second serial number may be greater than the first serial number.

Figure 4:
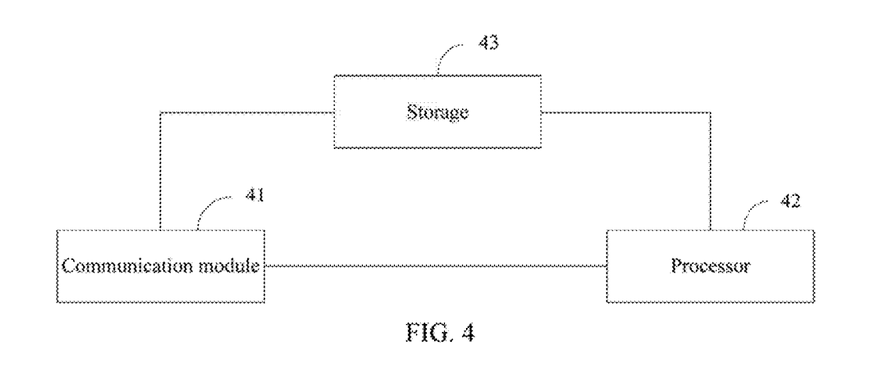
FIG. 4 illustrates a block diagram of a gateway consistent with various disclosed embodiments of the present disclosure.

FIG. 4 illustrates an exemplary block diagram of a disclosed gateway. As shown in FIG. 4, the disclosed gateway may include a communication module 41, a processor 42, and a storage 43.

The storage 43 may store the executable commands of the communication module 41 and the processor 42. The communication module 41 may receive the brightness-adjusting data and the serial number corresponding to the brightness-adjusting data sent by a smart lighting device. The processor 42 may determine whether the received serial number is greater than the latest serial number stored in the gateway. The communication module 41 may also report the received brightness-adjusting data to the server so that the server updates the stored brightness-adjusting result, when the processor 42 determines the received serial number is greater than the latest serial number stored in the gateway. The processor 42 may update the latest serial number stored in the gateway with the received serial number corresponding to the brightness-adjusting data, when the processor 42 determines the received serial number is greater than the latest serial number stored in the gateway, and discard the received brightness-adjusting data to maintain the brightness-adjusting result, when the processor 42 determines the received serial number is smaller than the latest serial number stored in the gateway.

According to the disclosed gateway, the communication module may receive the brightness-adjusting data and the serial number corresponding to the brightness-adjusting data, sent by the smart lighting device, and the processor may determine the relationship between the received serial number and the latest serial number stored in the gateway. When the received serial number is greater than the latest serial number stored in the gateway, the gateway may discard the received brightness-adjusting data. The gateway may report the received brightness-adjusting data to the server through the communication module when the received serial number is greater than the latest serial number stored in the gateway. The gateway also store executable commands of the communication module and the process through the storage. In the disclosed technical solution, based on the received serial number corresponding to received brightness-adjusting data, the gateway may recognize the time sequence of the received brightness-adjusting data sent by the smart lighting device, and process the received brightness-adjusting data in time. Inaccurate display of brightness-adjusting results due to network issues may be resolved.

In one embodiment, in the disclosed gateway, the initial serial data stored in the gateway may be zero. The initial serial number may be the serial number, of the gateway, before receiving any brightness-adjusting data.

In the present disclosure, various elements, shown as blocks, of the smart lighting device shown in FIG. 3 can be implemented through proper hardware and/or software.

The control module 34 may receive, process, and execute commands from the smart lighting device. The control module 34 may include any appropriately configured computer system. As shown in FIG. 3, control module 34 may include a processor, a random access memory (RAM), a read-only memory (ROM), a storage 1208, a display, an input/output interface, a database; and a communication interface. Other components may be added and certain devices may be removed without departing from the principles of the disclosed embodiments.

Processor may include any appropriate type of general purpose microprocessor, digital signal processor or microcontroller, and application specific integrated circuit (ASIC). Processor may execute sequences of computer program instructions to perform various processes associated with control module 34. Computer program instructions may be loaded into RAM for execution by processor from read-only memory, or from storage. Storage may include any appropriate type of mass storage provided to store any type of information that processor may need to perform the processes. For example, storage may include one or more hard disk devices, optical disk devices, flash disks, or other storage devices to provide storage space. The processor 42 of the gateway shown in FIG. 4 may also include similar functions of the processor of the smart lighting device.

Display may provide information to a user or users of the smart lighting device. Display may include any appropriate type of computer display device or electronic device display (e.g., CRT or LCD based devices). Input/output interface may be provided for users to input information into smart lighting device or for the users to receive information from the smart lighting device. For example, input/output interface may include any appropriate input device, such as a keyboard, a mouse, an electronic tablet, voice communication devices, touch screens, or any other optical or wireless input devices. Further, input/output interface may receive from and/or send to other external devices.

Further, database may include any type of commercial or customized database, and may also include analysis tools for analyzing the information in the databases. Communication interface may provide communication connections such that driving chip may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may input a desired brightness value through an APP on a smart terminal, into the communication module 33. The control module 34 may receive the desired brightness value as a brightness-adjusting command from the communication module 33, and control the light source 31 to the desired brightness value. The communication module 33 may report the brightness-adjusting data the gateway, shown in FIG. 4, through the communication module 41. The processor 42 of the gateway may compare the received serial number, contained in the brightness adjusting data, with the latest serial number stored in the gateway. When it is determined the received serial number is greater than the latest serial number stored in the gateway, the gateway may report the received serial number to the server such that the server may update the brightness-adjusting result. Also, the gateway may update the latest serial number stored in the gateway to be the received serial number. When it is determined the received serial number is smaller than the latest serial number stored in the gateway, the gateway may discard the brightness-adjusting data and maintain the brightness-adjusting result in the server.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides a method for reporting brightness-adjusting data. The brightness-adjusting commands, received by the smart lighting device, are used to adjust the brightness of the smart lighting device. The gateway may compare the receive serial number, contained in the brightness-adjusting data received by the gateway from the smart lighting device, with the latest serial number stored in the gateway. When the received serial number is greater than the latest serial number stored in the gateway, the gateway may report the received brightness-adjusting data to the server and update the latest serial number stored in the gateway. When the received serial number is smaller than the latest serial number stored in the gateway, the received brightness-adjusting data may be discarded, to ensure the brightness-adjusting data stored in the server to be the accurate brightness-adjusting result. The problem of inaccurate display of brightness-adjusting result caused by network issues can be solved.

Further, the present disclosure provides a smart lighting device. The disclosed smart lighting device may receive the brightness-adjusting command, sent by a smart terminal, through the communication module. The brightness-adjusting command may include the brightness-adjusting data. The smart lighting device may adjust, through the control module, the brightness value of the light source according to the brightness-adjusting command. After the control module completes the adjustment of the brightness value of the light source, the disclosed smart lighting device may report the brightness-adjusting data and the serial number corresponding to the brightness-adjusting data to the gateway through the communication module. In the disclosed technical solution, by reporting the serial number at the same time with the brightness-adjusting data, the gateway may process the brightness-adjusting data properly based on the received serial number. Thus, inaccurate display of brightness-adjusting results due to network issues can be solved.

Further, the present disclosure may further provide a gateway. According to the disclosed gateway, the communication module of the gateway may receive the brightness-adjusting data and the serial number corresponding to the brightness-adjusting data, sent by the smart lighting device, and the processor of the gateway may determine the relationship between the received serial number and the latest serial number stored in the gateway. When the received serial number is greater than the latest serial number stored in the gateway, the gateway may discard the received brightness-adjusting data. The gateway may report the received brightness-adjusting data to the server through the communication module when the received serial number is greater than the latest serial number stored in the gateway. The gateway also store executable commands of the communication module and the process through the storage. In the disclosed technical solution, based on the received serial number corresponding to received brightness-adjusting data, the gateway may recognize the time sequence of the received brightness-adjusting data sent by the smart lighting device, and process the received brightness-adjusting data in time. Inaccurate display of brightness-adjusting results due to network issues may be resolved.

REFERENCE SIGN LIST

Smart terminals 11
Smart lighting devices 12
Gateway 13
Server 14
Ethernet 15
Cloud 16
Light source 31
Power supply component 32
Communication module (of a smart lighting device) 33
Control module 34
Communication module (of a gateway) 41
Processor 42
Storage 43

What is claimed is:

1. A method for reporting brightness-adjusting data from a lighting device that includes a control module and a communication module, comprising:
receiving a brightness-adjusting command from a terminal device, the brightness-adjusting command containing brightness-adjusting data having a desired brightness value;
adjusting, through the control module of the lighting device, a brightness value to the desired brightness value according to the brightness-adjusting command;
reporting, through the communication module of the lighting device, the brightness-adjusting data and a serial number corresponding to the brightness-adjusting data to a gateway, wherein: the gateway includes a processor and a communication module, and the serial number increases in accordance with a sequence the brightness-adjusting data are reported to the gateway;
determining, through the processor of the gateway, whether the serial number is greater than a latest serial number stored in the gateway;
when the serial number is greater than the latest serial number:
reporting, through the communication module of the gateway, the brightness-adjusting data to a server;
updating, through the server, a brightness-adjusting result according to the brightness-adjusting data; and
updating, through the processor of the gateway, the latest serial number with the serial number; and
when the serial number is smaller than the latest serial number, discarding, through the processor of the gateway, the brightness-adjusting data so as to maintain previous brightness-adjusting data in the server.

2. The method according to claim 1, wherein:
the brightness-adjusting data includes a plurality of brightness-adjusting data each containing a serial number different from one another,
the serial number arranged in accordance with a time sequence corresponding to the brightness-adjusting data are reported to the gateway, and
a later-reported serial number is greater than an earlier-reported serial number.

3. The method according to claim 2, further comprising: initiating the latest serial number stored in the gateway to zero as an initial serial number before the gateway receives the brightness-adjusting data.

4. The method according to claim 3, wherein:
the brightness-adjusting data includes first light-adjusting data corresponding to a first serial number, and second brightness-adjusting data corresponding to a second serial number; and
the method further comprises: reporting the first light-adjusting data with the first serial number to the gateway before reporting the second light-adjusting data with the second serial number, the second serial number being greater than the first serial number and the first serial number being greater than the initial serial number.

5. The method according to claim 1, wherein
the lighting device receives the brightness-adjusting command through wireless transmission means from the terminal device; and
the lighting device reports the brightness-adjusting data and the serial number to the gateway through wireless transmission means.

6. The method according to claim 5, wherein the wireless transmission means includes one or more of a Zigbee transmission, WiFi transmission, or Bluetooth transmission.

7. A lighting device, comprising a light source, a power supply component, a communication module, and a control module, wherein:
the power supply component provides power for the light source, the communication module, and the control module;
the communication module receives a brightness-adjusting command from a terminal device, the brightness-adjusting command containing brightness-adjusting data having a desired brightness value;
the control module adjusts a brightness value of the lighting device to the desired brightness value; and
the communication module reports the brightness-adjusting data and a serial number corresponding to the brightness-adjusting data to a gateway after the control module completes adjusting the brightness value of the lighting device, wherein:
the gateway includes a processor and a communication module,
the serial number increases in accordance with a sequence the brightness-adjusting data are reported to the gateway,
the processor of the gateway determines whether the serial number is greater than a latest serial number stored in the gateway,
when the serial number is greater than the latest serial number, the communication module of the gateway reports the brightness-adjusting data to a server, the server updates a brightness-adjusting result according to the brightness-adjusting data, and the processor of the gateway updates the latest serial number with the serial number, and when the serial number is smaller than the latest serial number, the processor of the gateway discards the brightness-adjusting data so as to maintain previous brightness-adjusting data in the server.

8. The lighting device according to claim 7, wherein the brightness-adjusting data includes a plurality of brightness-adjusting data each containing a serial number different from one another, the serial number being arranged in accordance with a time sequence corresponding brightness-adjusting data are reported to the gateway.

9. The lighting device according to claim 8, wherein the communication module reports each set of brightness-adjusting data with a corresponding serial number to the gateway in accordance with the time sequence, a later-reported serial number being greater than an earlier-reported serial number.

10. A gateway, comprising: a communication module, and a processor, wherein:
the communication receives brightness-adjusting data and a serial number contained in the brightness-adjusting data sent by a lighting device, wherein: a brightness value of the lighting device is adjusted to a desired brightness value of the brightness-adjusting data;
the processor determines whether the serial number is greater than a latest serial number stored in the gateway;
when the serial number is greater than the latest serial number, the communication module reports the brightness-adjusting data to a server such that the server updates a brightness-adjusting result according to the brightness-adjusting data, and the processor updates the latest serial number with the serial number; and
when the serial number is smaller than the latest serial number, the processor discards the brightness-adjusting data so as to maintain previous brightness-adjusting data in the server.

11. The gateway according to claim 10, wherein the latest serial number is an initial serial number equal to zero, the initial serial number being a serial number before the gateway receives the brightness-adjusting data.

\* \* \* \* \*